(12) United States Patent
Lalinde et al.

(10) Patent No.: US 11,395,062 B2
(45) Date of Patent: Jul. 19, 2022

(54) ADJUSTABLE SENSORS

(71) Applicant: Hewlett-Packard Development Company, L.P., Spring, TX (US)

(72) Inventors: Paul Roberto Lalinde, Spring, TX (US); Stanley Wang, Taipei (TW); Chi So, Spring, TX (US); Ben A. Knight, Spring, TX (US); Robert C. Brooks, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,108

(22) PCT Filed: Jun. 26, 2018

(86) PCT No.: PCT/US2018/039512
§ 371 (c)(1),
(2) Date: Oct. 16, 2020

(87) PCT Pub. No.: WO2020/005209
PCT Pub. Date: Jan. 2, 2020

(65) Prior Publication Data
US 2021/0176560 A1    Jun. 10, 2021

(51) Int. Cl.
*H04R 3/00* (2006.01)
*H04R 1/32* (2006.01)
*H04R 1/04* (2006.01)
*G06V 40/16* (2022.01)

(52) U.S. Cl.
CPC .......... *H04R 1/326* (2013.01); *G06V 40/166* (2022.01); *H04R 1/04* (2013.01); *H04R 3/00* (2013.01)

(58) Field of Classification Search
CPC . H04R 1/326; H04R 1/04; H04R 3/00; G06K 9/00255; G06V 40/166
USPC .................................................. 381/92, 122
See application file for complete search history.

(56) References Cited

U.S. PATENT DOCUMENTS

| | | | |
|---|---|---|---|
| 5,767,905 A * | 6/1998 | Archambo | A61G 5/10 348/373 |
| 7,057,888 B2 | 6/2006 | Oakley | |
| 9,232,071 B2 | 1/2016 | Visser et al. | |
| 2005/0014527 A1 | 1/2005 | Chambers et al. | |
| 2006/0068722 A1 | 3/2006 | Ashman, Jr. | |

(Continued)

FOREIGN PATENT DOCUMENTS

| | | | | |
|---|---|---|---|---|
| WO | WO-2017066513 A1 * | 4/2017 | | A01M 1/20 |
| WO | WO2017066513 A1 | 4/2017 | | |
| WO | WO-2017066514 A1 * | 4/2017 | | C03C 25/10 |

OTHER PUBLICATIONS

Frank Tu, DOOV V1's specs leaked, another rotating camera phone from China, Oct. 19, 2014, Gizmochina.

(Continued)

*Primary Examiner* — Ammar T Hamid
(74) *Attorney, Agent, or Firm* — Brooks Cameron & Huebsch PLLC (57) ABSTRACT

Example implementations relate adjustable sensors. For example, a system comprising a housing, a detector to detect a location of an object in an environment surrounding the housing, an adjustable arm coupled to the housing, and a sensor disposed on the adjustable arm to adjust a distance between the sensor and the location of the object responsive to detection of the location of the object.

14 Claims, 6 Drawing Sheets

(56) References Cited

U.S. PATENT DOCUMENTS

| | | |
|---|---|---|
| 2008/0125171 A1 | 5/2008 | Shin |
| 2010/0304799 A1 | 12/2010 | Leung et al. |
| 2013/0156209 A1* | 6/2013 | Visser .................... H04M 1/20 |
| | | 381/66 |
| 2016/0311646 A1* | 10/2016 | Bryant .................... B66B 1/468 |
| 2017/0034319 A1 | 2/2017 | Chenn |

OTHER PUBLICATIONS

NDTV Correspondent, Huawei Honor 7i With 13-Megapixel Rotating Camera, 5.2-Inch Display Launched, Aug. 20, 2015, Gadgets 360.

* cited by examiner

ADJUSTABLE SENSORS

BACKGROUND

Sensors can be utilized to convert sound waves into electrical impulses. Sensors can convert small acoustic vibrations into electrical waves, for example, in sound recording, megaphones, radio, and television broadcasting, etc.

DETAILED DESCRIPTION

Electronic devices, such as a computer can include a microphone to utilize in audio and video conferencing applications, phone applications, voice over Internet Protocol (VoIP) applications, voice recognition applications, etc. However, while converting sound waves into electrical impulses the microphone can pick up background noise and/or interference. Such background noise and/or interference can be attributable at least in part to the microphone being in a fixed position such as being in a fixed position that is too close to a sound detector and/or a speaker.

For instance, a microphone can be located in the same housing as a speaker in a device. The microphone can include a diaphragm that can be subject to vibration when the diaphragm is struck by a sound wave such as a soundwave emitted by the speaker. As the diaphragm vibrates, it can cause other components in the microphone to vibrate. These vibrations can convert into electrical current which can become an unintended audio signal.

In some instances, the speaker and the microphone in the housing of a device can be located too close or otherwise positioned relative to each other to create background noise and/or interference. As a result, the quality of audio output by the device can be low due to the background noise and/or interference.

Some approaches to reduce the background noise and interference can be to use a panel including a microphone and a speaker. The panel can be extendable and/or retractable relative to a display housing. However, such approaches can result in background noise and interference due to movement of the panel. Some approaches can map the speaker-to-microphone distance profile and implement echo cancelation to compensate for any unwanted signal feedback. However, such approaches can still result in picking up interference while mapping speaker to microphone distance as the location of the speaker can change. The location of an object and/or a speaker can cause interference due to the presence of other interfering audio sources. For example, if an object is too closely located to a speaker, the object can generate passive interference by breathing, moving and etc. Contrarily, if an object is located further away from a speaker, the object and/or the surrounding environment can generate active interference by other noise sources.

Accordingly, the disclosure is directed to adjustable sensors. For instance, a system can include a housing, a detector to detect a location of an object in an environment surrounding the housing, an adjustable arm coupled to the housing, and a sensor disposed on the adjustable arm. As detailed herein, the adjustable arm can have three degrees of freedom and can adjust a distance between the sensor and the location of the object responsive to the detection of the location of the object. For instance, the adjustable arm can be adjusted to decrease the distance between the sensor and an object (e.g., a sound source) minimize or eliminate background noise. However, in some examples, a distance between the sensor and the object can be increased to avoid interference. For example, depending upon room acoustics, minimizing the distance between the sensor and the object can result in interference, but increasing the distance can eliminate or reduce the interference. In some examples, the object can be sound source, and/or a can be an object included in an image/video (when the sensor is a light/video sensor).

Figure 1A:
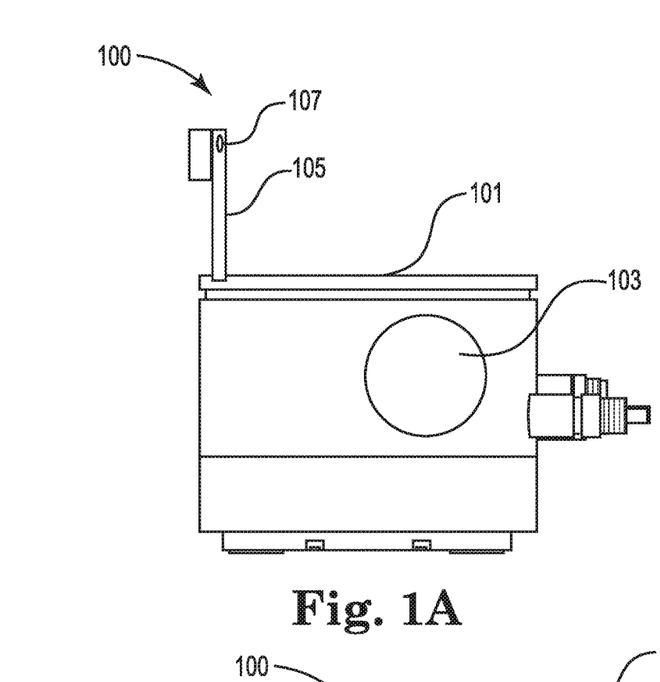
FIGS. 1A, 1B, and 1C illustrate a system including a housing, a detector, an adjustable arm and a sensor disposed on the adjustable arm, according to the disclosure.
Figure 1B:
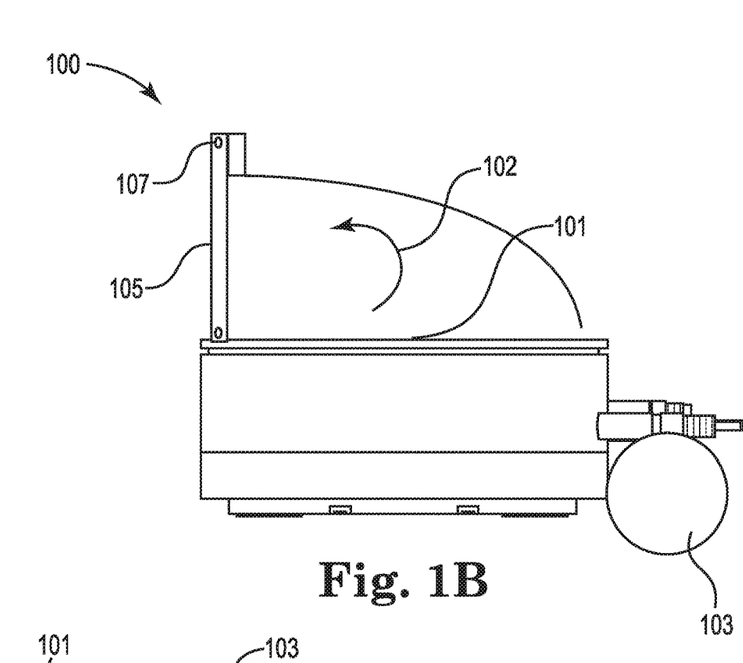
Figure 1C:
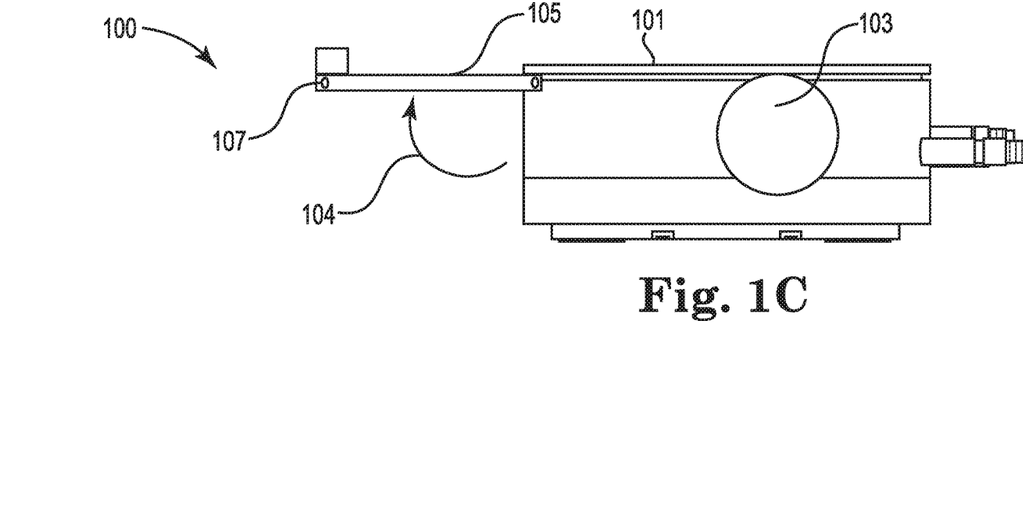

FIGS. 1 A-C illustrate a system 100 including a housing 101, a detector 103, an adjustable arm 105, and a sensor 107 disposed on the adjustable arm 105, according to the disclosure. Housing 101 can include an outer shell of a device (e.g., computer case, computer chassis, base unit of a device, etc.). In some examples, the detector 103 can be positioned inside the housing 101, among other possibilities. In some examples, adjustable arm 105 can turn 90 degrees along axis 102. In some examples, adjustable arm 105 can turn 30 degrees along axis 104.

As used herein, the term, "detector" refers to an apparatus to detect the presence of a particular object and/or substance and to emit a signal in response. For example, the detector 103 can detect the presence of an object in the environment and emit sound signal based on the signal received from the object. In some examples, the detector 103 can be positioned inside the housing 101 of system 100 (as illustrated in FIG. 1A). Detector 103 can detect the presence of an object in an environment surrounding the housing 101. As detector 103 detects the presence of an object, it can emit a signal in response to the detection of the object. In some examples, the detector 103 can be positioned outside housing 101 (as illustrated in FIG. 1B), and detect the presence of an object in an environment surrounding the housing 101. In response to the detection of the object, the detector 103 can emit signal which can be received by sensor 107. Detector 103 can include an audio detector, a light detector, or a combination of an audio detector and a light detector. In some examples, detector 103 can be a directional microphone to enhance some sound from the environment surrounding, for example speech from a user, and to diminish background noise.

As used herein, the term "sensor" refers to a module and/or subsystem whose purpose is to identify events or changes in its environment and send the information to other modules and/or subsystems (e.g., controller, computer processor, etc.). In some examples, the sensor 107 can receive a signal as detector 103 detects the presence of an object in an environment surrounding the housing. Sensor 107 can be disposed on the adjustable arm 105. In some examples, sensor 107 can be audio sensors. In some examples the audio sensors can include a microphone and processing circuitry. For example, sensor 107 can include a microphone and processing circuitry and provide an audio output as well as a binary indication of the presence of sound. In some examples, sensor 107 can provide an analog representation of the sound's amplitude. In some examples, sensor 107 can be an image sensor. An image sensor can do image analysis and identify the location of an object in a given environment. In some examples, sensor 107 can do image analysis by evaluating scenes recorded by a video camera. In some examples, sensor 107 can include a facial recognition system, as described herein.

Sensor 107 can be disposed on the adjustable arm 105. As described herein, "adjustable arm" refers to an elongate part that connects the sensor to the housing that can be adjusted about the housing. Adjustable arm 105 has two degrees of freedom, as described herein. In some examples, sensor 107 can adjust adjustable arm 105 via a controller, as described herein. Conversely, the adjustable arm can be manually adjusted. In some examples, the adjustable arm 105 can adjust a distance between the sensor 105 and the location of the object in response to detection of the location of the object. Adjustable arm 105 can be extended, retracted, rotated about the housing 101. In some examples, adjustable 105 can be extended from housing 101 to reduce the distance between sensor 107 and a detected object. For example, the detector 103 can detect an object and emit a signal to sensor 107 regarding the location of the object. Sensor 107 can detect the object, for example, to be fourteen inches away and with high interference and low audio quality. In response to receiving information about the location of the object, the sensor 107 can determine that reducing the distance to twelve inches between the sensor 107 and the object can improve the sound quality. Sensor 107, via a controller, can send signal to the adjustable arm 107 to extend the arm closer to the location of the object to achieve the twelve inches distance between the sensor 107 and the object. As the distance between the sensor 107 and the object reduces, the interference can be reduced, and high sound quality can be achieved. In some examples, adjustable 105 can be retracted towards housing 101 to increase the distance between the sensor 107 and a detected object. In some examples, sound quality improvement can be determined through adjusting the adjustable arm 105 to different distances and sensing the resultant audio quality and/or through other mechanism.

For example, the detector 103 can detect an object and emit a signal to sensor 107 regarding the location of the object. Sensor 107 can detect the object, for example, to be fourteen inches away and with interference and low audio quality. In response to receiving information about the location of the object, the sensor 107 can, via a controller, determine that increasing the distance to eighteen inches between the sensor 107 and the object can eliminate the interference. Sensor 107 can send signal to the adjustable arm 107 to retract away from the location of the object to achieve the eighteen inches of distance between the sensor 107 and the object. As the distance between the sensor 107 and the object is increased, the interference can be reduced, and high sound quality can be achieved. In some examples, a user can receive instruction to manually adjust the adjustable arm 105 by adjusting the distance between the user and the sensor 107.

In some examples, adjustable arm 105 is coupled to the housing 101 via a hinge. The hinge connects the arm to the housing 101 and facilitates adjustable arm 105 to be adjusted and/or be rotated. In some examples the adjustable arm 105 in a vertical position can rotate via the hinge to a horizontal orientation relative to a base of the housing 101. In some examples, adjustable arm 105 can turn 90 degrees along axis 102 (as illustrated in FIG. 1B) clockwise and anti-clockwise about the hinge. In some examples, adjustable arm 105 can turn 30 degrees along axis 104 (as illustrated in FIG. 1C) clockwise and anti-clockwise about the hinge. In some examples, adjustable arm 105 can be extended in length from housing 101, as described herein.

Figure 2:
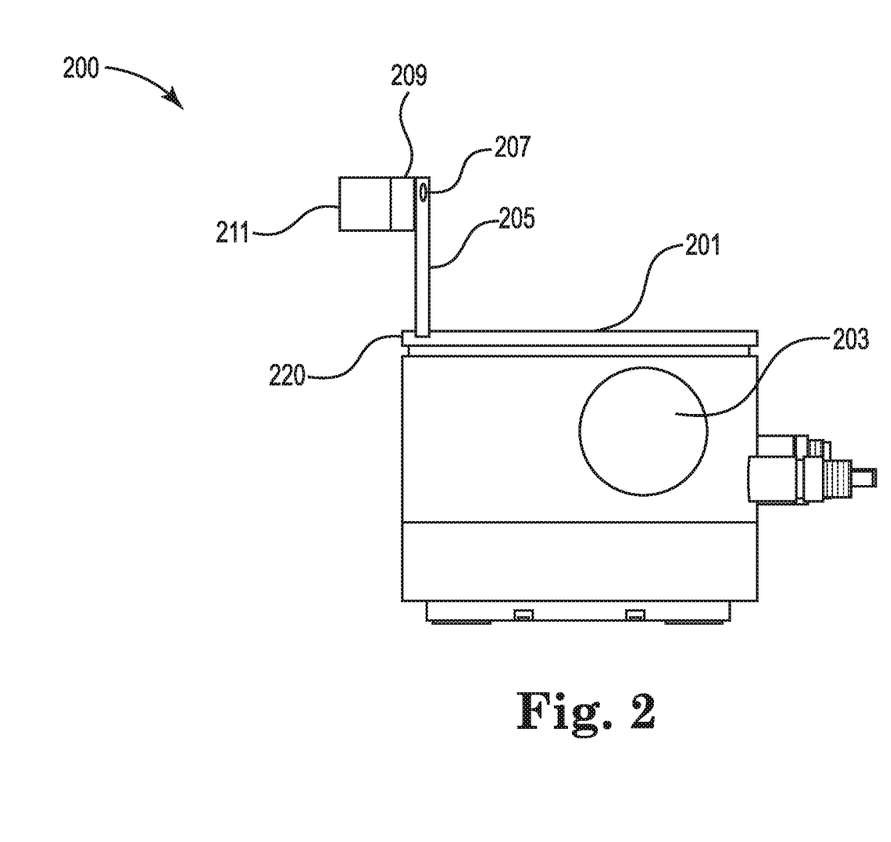
FIG. 2 illustrates a system including a housing, a detector, an adjustable arm, a sensor disposed on the adjustable arm, an image sensor, a rotatable head, and a hinge, according to the disclosure.

In some examples, the adjustable arm 105 includes a rotatable head (e.g., rotatable head 211, as illustrated in FIG. 2). The rotatable head can rotate about the adjustable arm 105. For instance, the rotatable head can rotate 360 degrees about the adjustable 105. The rotatable head can change directions of the adjustable arm 105 to detect the location of an object surrounding the environment.

Sensor 107 can be disposed on the adjustable arm 105. In some examples, sensor 107 can include an audio sensor. An audio sensor can detect and convey information that constitutes a sound (e.g., dynamic microphone, condenser microphone, ribbon microphone, carbon microphone, etc.). In some examples, sensor 107 can include an image sensor. An image sensor can detect and convey information that constitutes an image (e.g., analog camera, digital camera, semiconductor charge-coupled devices (CCD), active pixel sensors, etc.).

Figure 4:
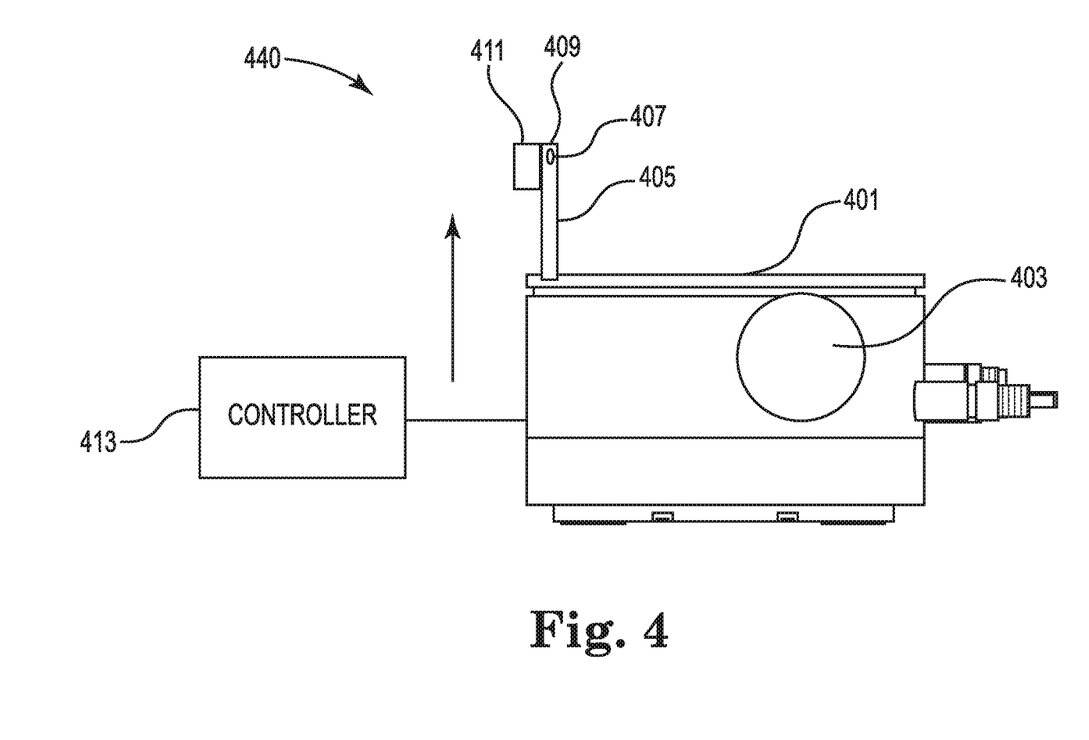
FIG. 4 illustrates a diagram of a device according to the disclosure.

Sensor 107 can include a facial recognition system. In some examples, sensor 107 can identify and/or verify a person from a digital image or a video frame from a video source. Upon identifying an image of a person, the sensor 107 can compare selected facial features from given image with faces within a database. A controller (e.g. controller 413 as illustrated in FIG. 4) can facilitate adjusting the distance between the sensor 107 and detector 103 in response in response to the detection of the object.

FIG. 2 illustrates a system 200 including a housing 201, a detector 203, an adjustable arm 205, a sensor 207 disposed on the adjustable arm 205, an image sensor 211, a rotatable head 209, and a hinge 220, according to the disclosure. The adjustable arm 205 can include sensor 207 disposed on the adjustable arm 205. The sensor 207 can be disposed at any location along the elongate body of the adjustable arm 205. For example, sensor 207 can be deposed at the distal end from the base of the housing 201. In some examples, the sensor 207 can be disposed around the center of the adjustable arm 205.

A rotatable head 209 can be coupled to the adjustable arm 205. In some examples, the rotatable head 209 can rotate 360 degrees about the adjustable arm 205. Via a controller (e.g., controller 413 in FIG. 4), the rotatable head 209 can change directions of the adjustable arm 205 by detecting the location of an object surrounding the environment. For example, rotatable head can rotate 180 degrees from its initial position and detect an object at a 180 degree angle from the base of housing 201. Upon detecting the object, adjustable arm 205 can change its position from a vertical orientation (as illustrated in FIG. 1A) to a horizontal orientation (as illustrated in FIG. 1C), to bring the sensor 207 disposed in the adjustable arm 205 closer to the location of the object.

In some examples, the rotatable head 209 can include an image sensor. In some examples, the image sensor (e.g., a 360-degree camera) coupled to the rotatable head 209 can capture light from all directions falling onto the image sensor's focal point. Thereby, the image sensor coupled to the rotatable head 209 can cover a full sphere and detect objects around the sphere. In some examples, the rotatable head 209 can include an audio sensor. The audio sensor (e.g., a directional microphone) coupled to the rotatable head 209 can directionality choose the source of the audio signal, and to rotate the adjustable arm 205 towards the source to choose which audio signal to focus on.

The adjustable arm 205 is coupled via hinge 220 to the housing 201 of system 200. The hinge 220 facilitates the adjustable arm 205 to rotate around the base and adjust a distance between the sensor 207 and the location of an object detected by the detector 203. Hinge 220 can be a point around which the adjustable arm 205 can extend, retracted and rotate about the housing 201. In some examples, adjustable arm 205 in a vertical position can rotate around hinge 220 to a horizontal orientation relative to a base of the housing 201 (as illustrated in FIG. 1C)

Figure 3:
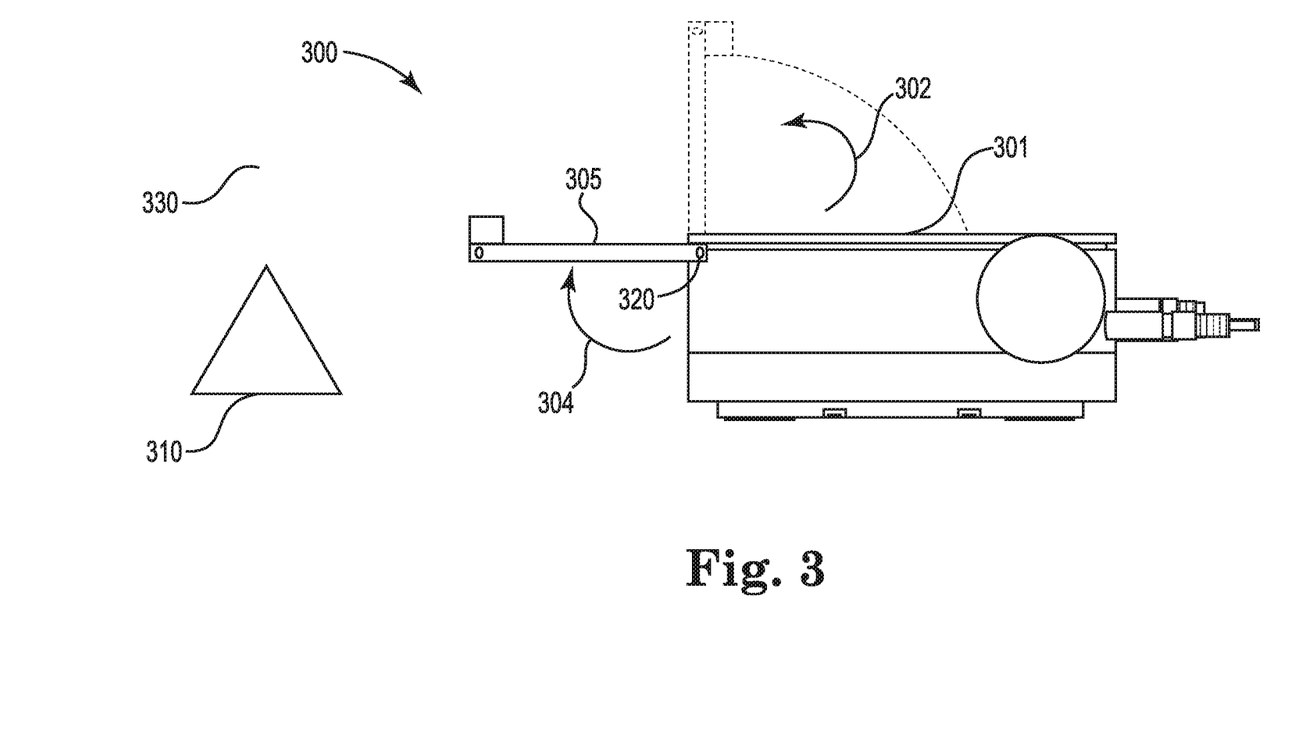
FIG. 3 illustrates a system according to the disclosure.

FIG. 3 illustrates a system 300 according to the disclosure. System 300 includes housing 301, an adjustable arm 305, a hinge 320, and an object 310 in an environment 330. System 300 can detect, using a detector, the presence of the object 310 in the environment 330 surrounding the housing 301. The detector can emit a signal in response to the detection of the object 310 in the environment 330. The signal emitted by the detector can be received by a sensor disposed on the adjustable arm 305. The adjustable arm 305 coupled to the housing 301 via hinge 320 can turn 30 degrees along axis 304 relative to the base of the housing 301 to decrease the distance between the sensor disposed in the adjustable arm, and the location of the object 310 the environment 330. In some examples, adjustable arm 305 can turn 90 degrees along axis 302 relative to the base of the housing 301 to increase the distance between the sensor disposed in the adjustable arm 305, and the location of the object 310.

In some examples, the object 310 can be a sound source. For example, speech from the object 310. The sensor detecting the sound source of the object 310 can be an audio sensor, such as a sensor similar to the sensor 107 illustrated in FIG. 1. In some examples, the audio sensor can include a microphone and processing circuitry and provide an audio output of the sound received from the object 310. In some examples, the object 310 can be an image source. The sensor detecting the image source of the object 310 can be an image sensor, similar to the sensor 211 illustrated in FIG. 2. The image sensor can do image analysis and identify the location of the object 310 in the environment 330. In some examples, the image sensor can do image analysis by evaluating scenes recorded by a video camera.

FIG. 4 illustrates a diagram of a device 440 according to the disclosure. Device 440 includes a housing 401, a detector 403, an adjustable arm 405, a sensor 407 disposed on the adjustable arm 405, a rotatable head 409, an image sensor 411 and a controller 413 according to the disclosure. Housing 401 can include an outer shell of a device (e.g., computer case, computer chassis, base unit of a device, etc.). In some examples, a detector can be positioned inside the housing.

The detector 403 can detect the presence of an object in the environment and emit sound signal based on the signal received from the object. Detector 403 can detect the presence of an object in an environment surrounding the housing 401. As detector 403 detects the presence of an object, it can emit a signal in response to the detection of the object via the controller 413, as described herein. The detector 403 can be positioned inside and/or outside housing 401. In response to the detection of the object, the detector 403 can emit signal which can be received by sensor 407.

Sensor 407 can adjust adjustable arm 405 via the controller 413. Controller 413 can include a processor for retrieval and execution of instructions stored in machine-readable storage medium, as described in FIG. 5. In some examples, detector 403 can detect a location of an object (for example object 310 in FIG. 3) in the surrounding environment. Controller 413 can execute instruction to receive information from the detector 403 regarding the location of the object.

Based on the location of the object, controller 413 can determine the distance between the object and the sensor 407 disposed in the adjustable arm 405. In response to determining the distance between the of the location of the object and the sensor 407, the controller 413 can execute instruction to the adjustable arm 405 to adjust the distance between the sensor 405 and the location of the object. In some examples, controller 413 can execute instructions to adjustable arm 405 to extend, retract, and/or rotate about the housing 401 based on the distance between the location of the object and the sensor 407. In some examples, controller 413 can instruct the adjustable arm 405 to extended from housing 401 to reduce the distance between sensor 407 and a detected object to avoid interference. In some examples, controller 413 can instruct adjustable arm 405 to retract towards housing 401 to increase the distance between the sensor 407 and a detected object to avoid interference.

In some examples, the detector 403 can detect an object and emit a signal to sensor 407 regarding the location of the object. Sensor 407 can detect the object via instructions executed by controller 413. In response to receiving information about the location of the object, the controller 413 can determine the distance between the sensor 407 and the object to be, for example, fourteen inches. Controller 413 can execute instructions to determine that reducing the distance to twelve inches between the sensor 407 and the object can reduce interference and improve the sound quality. Controller 413 can execute instructions to send signal to the adjustable arm 407 to extend the arm closer to the location of the object to achieve the twelve inches distance between the sensor 407 and the object. As the distance between the sensor 407 and the object reduces, the interference can be reduced, and high sound quality can be achieved. In some examples, controller 413 can instruct adjustable 405 to retract towards housing 401 to increase the distance between the sensor 407 and the detected object. For example, the detector 403 can detect an object and emit a signal to sensor 407, via controller 413, regarding the location of the object. Controller 413 can detect the object, for example, to be fourteen inches away and with interference and low audio quality. In response to receiving information about the location of the object, the controller can determine that increasing the distance to eighteen inches between the sensor 407 and the object can eliminate the interference. Controller 413 can send signal to the adjustable arm 407 to retract away from the location of the object to achieve the eighteen inches distance between the sensor 407 and the object. As the distance between the sensor 407 and the object is increased, the interference can be reduced, and high sound quality can be achieved.

The adjustable arm 405 of device 400 includes a rotatable head 409. The rotatable head 409 can rotate 360 degrees about the adjustable arm 405. Controller 413 can execute instruction to rotate the rotatable head 409. The rotatable head can change directions of the adjustable arm 405 to detect the location of an object surrounding the environment. For example, rotatable head 409 can rotate 180 degrees from its initial position and detect an object at 180 degrees from the base of the housing 401. Upon detecting the object, adjustable arm 405 can change its position from a vertical orientation to a horizontal orientation to bring the sensor 407 closer to the location of the object.

In some examples, device 400 can include an audio sensor. 407. In some examples, the device 400 can include an image sensor. In some example, device 400 can include both an audio sensor 407, and an image sensor 411. In some examples, the image sensor 411 can be disposed in the adjustable arm 405. In some examples, the image sensor can be coupled to the adjustable arm 405. In some examples, the image sensor 411 can convert light waves as they pass through or reflect off an object into signals, small bursts of current that convey the information. The waves can be light, sound, and/or other electromagnetic radiation. In some examples, image sensor 411 can be analog and/or digital types devices. In some examples, the controller 413 can adjust the adjustable arm 405 by adjusting the distance between the image sensor 411 and the location of the object in response to detection of the location of the object via the detector 403.

Adjustable arm 405 of device 400 can be coupled to the housing 401 via a hinge (for example hinge 320 as illustrated in FIG. 3). In some examples adjustable arm 405 can expand from the base of housing 401. Controller 413 can execute instructions for adjustable arm to expand form the base of housing 401 in response to determining a distance between the sensor 405 and the location of the object.

Figure 5:
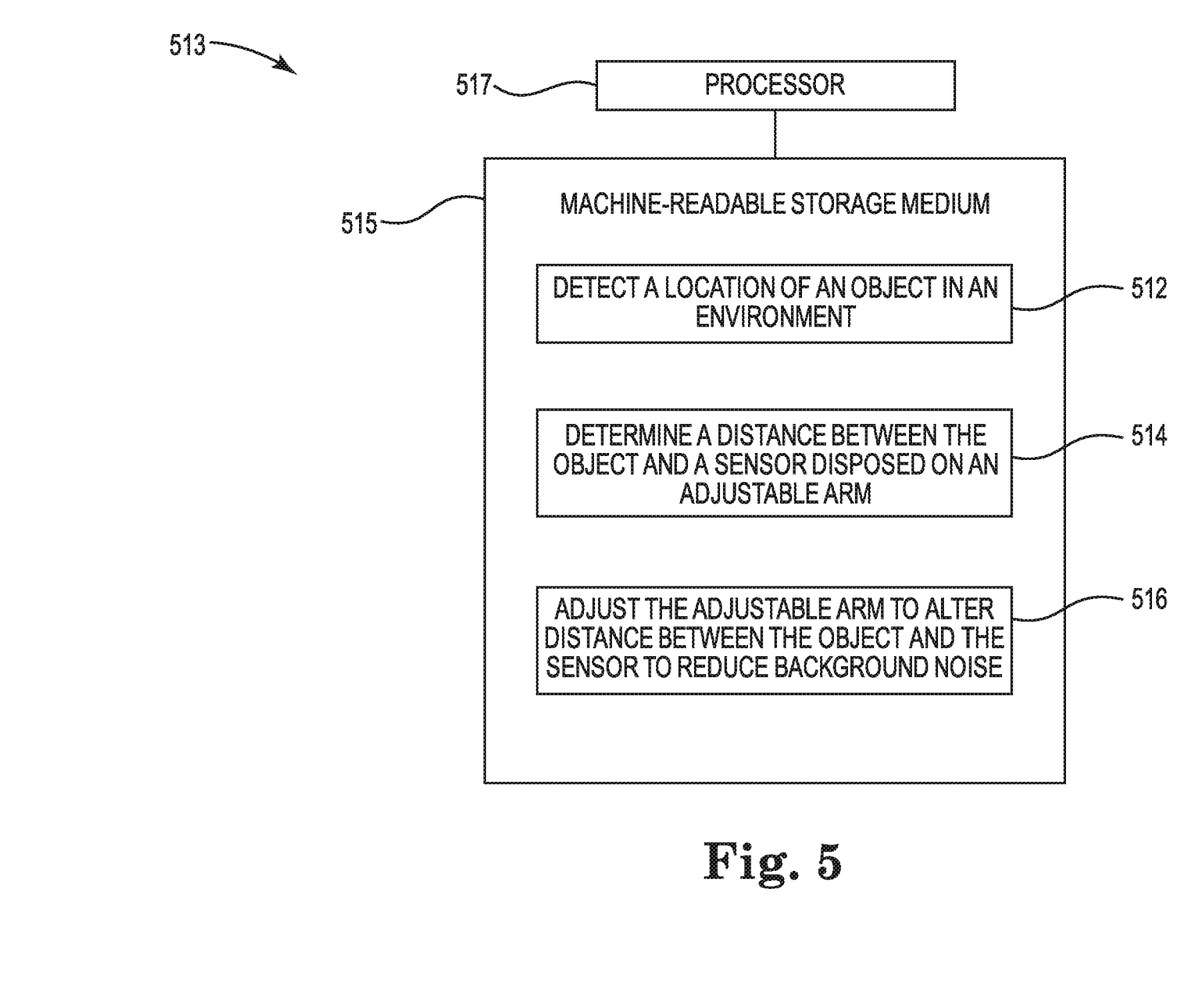
FIG. 5 illustrates a block diagram of an example of a controller according to the disclosure.

FIG. 5 is a block diagram of an example of a controller 513 consistent with the disclosure. In the example of FIG. 5, controller 513 includes a processor 517 and a machine-readable storage medium 515. Although the following descriptions refer to an individual processing resource and an individual machine-readable storage medium, the descriptions can also apply to a system with multiple processing resources and multiple machine-readable storage mediums. In such examples, the instructions can be distributed across multiple machine-readable storage mediums and the instructions can be distributed across multiple processing resources. Put another way, the instructions can be stored across multiple machine-readable storage mediums and executed across multiple processing resources, such as in a distributed computing environment.

Processor 517 can be a central processing unit (CPU), microprocessor, and/or other hardware device suitable for retrieval and execution of instructions stored in machine-readable storage medium 515. In the particular example shown in FIG. 5, processor 517 can detect, determine, and send instructions 512, 514, 516. As an alternative or in addition to retrieving and executing instructions, processor 517 can include an electronic circuit comprising a number of electronic components for performing the operations of the instructions in machine-readable storage medium 515. With respect to the executable instruction representations or boxes described and shown herein, it should be understood that part or all of the executable instructions and/or electronic circuits included within one box can be included in a different box shown in the figures or in a different box not shown.

Controller 513 can include instructions 512. Instructions 512, when executed by a processor, such as processor 517, can include instructions to detect a location of an object in the environment.

In some examples, controller 513 can be connected to a device, such as device 440 as illustrated in FIG. 4, which includes a detector. The detector can be located inside a housing. The detector can be located outside the housing. The detector can detect a location of an object in the surrounding environment and emit a signal in response to the detection of the object. At 512, the controller 513 can receive information from the detector regarding the location of the object.

Controller 513 can include instructions 514. Instructions 514, when executed by a processor, such as processor 517, can include instructions to determine a distance between the location of the object and a location of a sensor disposed on an adjustable arm.

Controller 513 can receive information about the location of the sensor. Based on the location of the object, controller 513 can determine the distance between the object and the sensor. The sensor can be disposed on an adjustable arm of the device. The sensor can be coupled to the adjustable arm. In some examples, the sensor can be coupled to a rotatable head of the adjustable arm. The rotatable head can change directions of the adjustable arm to detect the location of an object surrounding the environment. Controller 513 can execute instructions to rotate the rotatable head. For example, rotatable head can rotate 180 degrees from its initial position and detect an object at 180 from the base of the housing of the device.

Controller 513 can include instructions 516. Instructions 516, when executed by a processor, such as processor 517, can include instructions to adjust the adjustable arm to alter the distance between the location of the object and the location of the sensor disposed on the adjustable arm to reduce background noise. In some examples, instruction from controller 513, executed by the processor 517 can determine the distance between the sensor and the object is for example, fourteen inches. Controller 513 can execute instructions to determine that reducing the distance to twelve inches between the sensor and the object can reduce interference and improve the sound quality. Controller 513 can execute instructions to send signal to the adjustable arm to extend the arm to be closer to the location of the object to achieve the twelve inches distance between the sensor and the object. As the distance between the sensor and the object reduces, the interference can be reduced, and high sound quality can be achieved. In some examples, controller 513 can instruct adjustable arm to retract towards the housing to increase the distance between the sensor and the detected object. For example, controller 513 can detect the object, for example, to be fourteen inches away and with interference and low audio quality. In response to receiving information about the location of the object, the controller can determine that increasing the distance to eighteen inches between the sensor and the object can eliminate the interference. Controller 513 can send signal to the adjustable arm to retract away from the location of the object to achieve the eighteen inches distance between the sensor and the object. As the distance between the sensor and the object is increased, the interference can be reduced, and high sound quality can be achieved.

Figure 6:
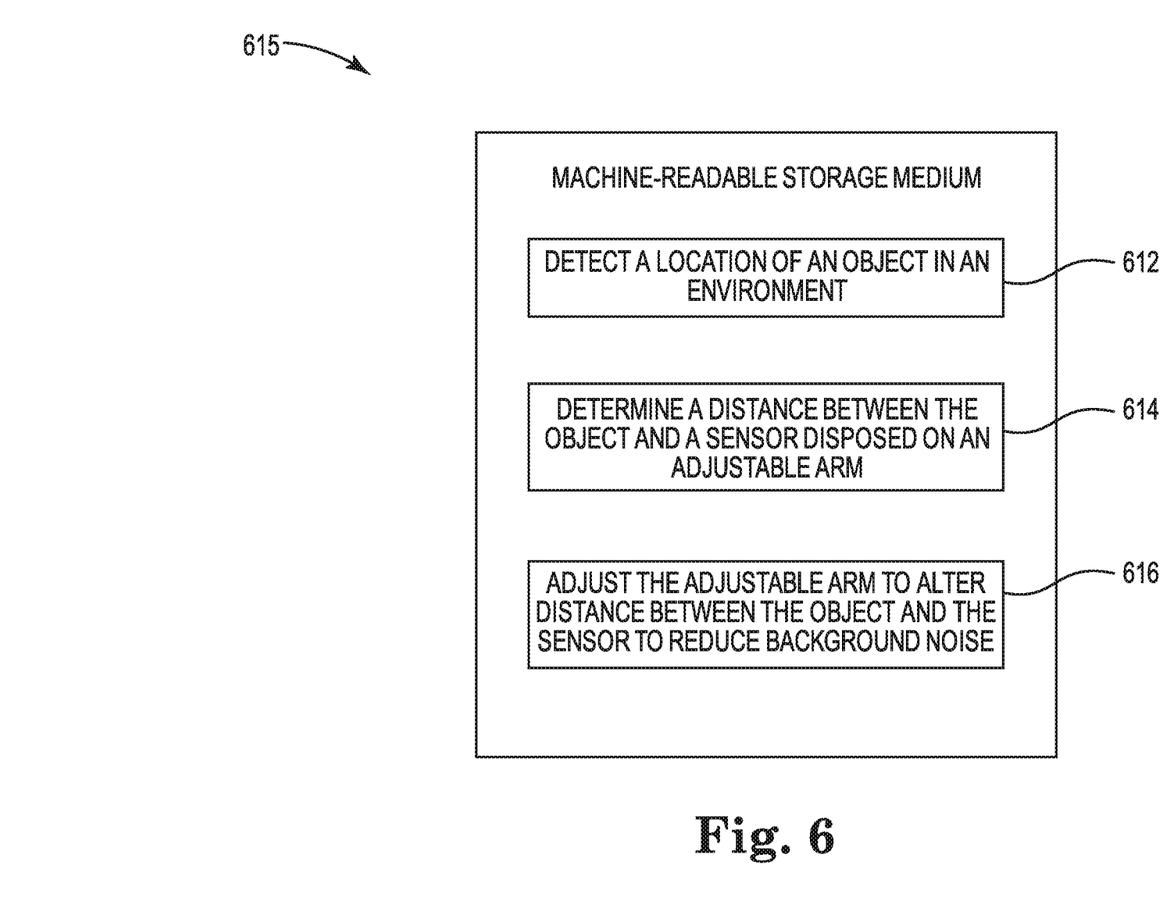
FIG. 6 illustrates a block diagram of an example of a machine-readable storage medium according to the disclosure.

FIG. 6 illustrates a block diagram of an example of a machine-readable storage medium 615. In the particular example shown in FIG. 6, machine-readable storage medium 615 can detect, determine, and send instructions 612, 614, 616.

System 615 can include instructions 612. Instructions 612, when executed by a processor, can include instructions to detect a location of an object in the environment.

In some examples, System 615 can be connected to a device, such as device 440 illustrated in FIG. 4, which includes a detector. The detector can be located inside a housing. The detector can be located outside the housing. The detector can detect a location of an object in the surrounding environment and emit a signal in response to the detection of the object. At 612, the system 615 can receive information from the detector regarding the location of the object.

System 615 can include instructions 614. Instructions 614, when executed by a processor, can include instructions to determine a distance between the location of the object and a location of a sensor disposed on an adjustable arm.

System 615 can receive information about the location of the sensor. Based on the location of the object, system 615 can determine the distance between the object and the sensor. The sensor can be disposed on an adjustable arm of the device. The sensor can be coupled to the adjustable arm. In some examples, the sensor can be coupled to a rotatable head of the adjustable arm. The rotatable head can change directions of the adjustable arm to detect the location of an object surrounding the environment. System 615 can execute instructions to rotate the rotatable head. For example, rotatable head can rotate 180 degrees from its initial position.

System 615 include instructions 616. Instructions 616, when executed by a processor, can include instructions to adjust the adjustable arm to alter the distance between the location of the object and the location of the sensor disposed on the adjustable arm to reduce background noise. In some examples, instruction from system 615, executed by the processor can determine the distance between the sensor and the object is for example, fourteen inches. System 615 can execute instructions to determine that reducing the distance to twelve inches between the sensor and the object can reduce interference and improve the sound quality. System 615 can execute instructions to send signal to the adjustable arm to extend the arm to be closer to the location of the object to achieve the twelve inches distance between the sensor and the object. As the distance between the sensor and the object reduces, the interference can be reduced, and high sound quality can be achieved. In some examples, system 615 can instruct adjustable arm to retract towards the housing to increase the distance between the sensor and the detected object. For example, system 615 can detect the object, for example, to be fourteen inches away and with high interference and low audio quality. In response to receiving information about the location of the object, the system 615 can determine that increasing the distance to eighteen inches between the sensor and the object can eliminate the interference. System 600 can send signal to the adjustable arm to retract away from the location of the object to achieve the eighteen inches distance between the sensor and the object. As the distance between the sensor and the object is increased, the interference can be reduced, and high sound quality can be achieved.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

What is claimed is:

1. A system, comprising:
   a housing;
   a detector to detect a location of a person in a room surrounding the housing;
   an adjustable elongated arm coupled to the housing; and
   a sensor including a microphone disposed at a distal end of the adjustable elongated arm, wherein the adjustable elongated arm is to adjust a distance between the sensor and the location of person by:
      expanding the adjustable elongated arm relative to the location of the person to increase the distance between the sensor and the location of the person and thereby reduce background noise; or
      contracting the adjustable elongated arm relative to the location of the person to increase the distance between the sensor and the location of the person and thereby reduce passive interference from the person.

2. The system of claim 1, wherein the adjustable elongated arm is coupled to the housing, wherein the adjustable elongated arm is coupled via a hinge to the housing to permit rotation of the adjustable elongated arm in a vertical orientation to a horizontal orientation relative to a base of the housing.

3. The system of claim 1, wherein the sensor further includes an image sensor.

4. The system of claim 1, wherein the adjustable elongated arm includes a rotatable head to change a direction of the adjustable elongated arm corresponding to the location of the person.

5. The system of claim 1, wherein the detector includes a directional microphone to detect a location of a sound emitted by the person.

6. The system of claim 3, wherein the image sensor includes a facial recognition system to detect a location of a face of the person.

7. A device comprising:
   a housing;
   an adjustable elongated arm coupled to the housing, wherein the adjustable elongated arm has three degrees of freedom;
   a sensor including a microphone, wherein the sensor is disposed at a distal end of the adjustable elongated arm;
   a detector to detect a location of a person in a room surrounding the housing; and
   a controller to adjust a distance between the sensor and the location of person by:
      expanding the adjustable elongated arm relative to the location of the person to increase the distance between the sensor and the location of the person and thereby reduce background noise; or
      contracting the adjustable elongated arm relative to the location of the person to increase the distance between the sensor and the location of the person and thereby reduce passive interference from the person.

8. The device of claim 7, wherein the adjustable elongated arm includes a rotatable head to rotate 360 degrees relative to the adjustable elongated arm.

9. The device of claim 7, wherein an image sensor couples to the adjustable elongated arm.

10. A non-transitory machine-readable medium storing instructions executable by a processing resource to:
    detect a location of a person in a room;

determine a distance between the location of the person and a location of a sensor including a microphone disposed on a distal end of an adjustable elongated arm coupled to a housing; and adjust a distance between the sensor and the location of person by:

expanding the adjustable elongated arm relative to the location of the person to increase the distance between the sensor and the location of the person and thereby reduce background noise; or  contracting the adjustable elongated arm relative to the location of the person to increase the distance between the sensor and the location of the person and thereby reduce passive interference from the person, wherein the passive interference further comprises sound associated with the person breathing, the person moving, or both.

11. The medium of claim 10, comprising instructions to rotate the adjustable elongated arm to a direction corresponding to the direction of the location of the person.

12. The medium of claim 11, comprising instructions to pivot the adjustable elongated arm, relative to the housing, to decrease the distance between the adjustable elongated arm and the location of the person.

13. The device of claim 7, wherein the passive interference further comprises sound associated with the person breathing, the person moving, or both.

14. The medium of claim 10, wherein the passive interference further comprises sound associated with the person breathing, the person moving, or both.

* * * * *